Figure 1:
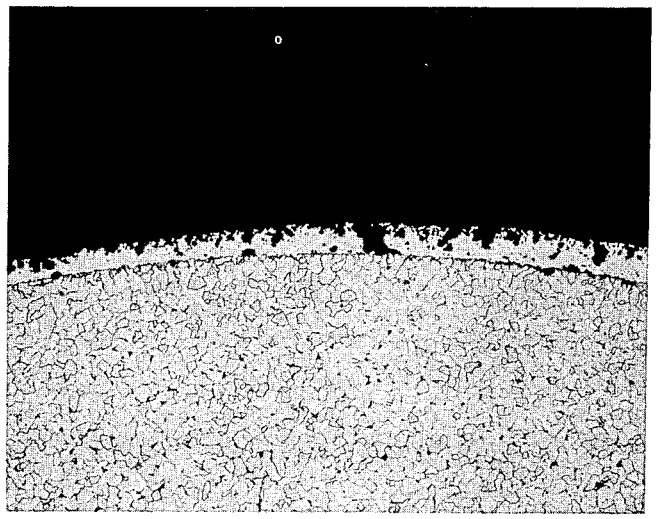

United States Patent [19]
Jackson et al.

[11] 3,989,863
[45] Nov. 2, 1976

[54] SLURRY COATING PROCESS

[75] Inventors: Raymond P. Jackson, New York, N.Y.; Jonathan A. Travis, Oak Ridge; Rodney B. Teel, Chatham, both of N.J.

[73] Assignee: The International Nickel Company, Inc., New York, N.Y.

[22] Filed: July 9, 1975

[21] Appl. No.: 592,452

[52] U.S. Cl. .......................... 427/367; 427/376 B; 427/191; 29/420.5; 29/191.2; 29/182.3
[51] Int. Cl.$^2$ ......................................... C23C 17/00
[58] Field of Search ........... 427/191, 383, 380, 367, 427/376; 29/191.2, 182.3, 420.5; 75/206

[56] References Cited
UNITED STATES PATENTS

| | | | |
|---|---|---|---|
| 2,490,543 | 12/1949 | Robertson | 427/380 X |
| 3,310,870 | 3/1967 | Parikh et al. | 427/383 X |
| 3,316,625 | 5/1967 | Flint et al. | 427/383 X |
| 3,565,663 | 2/1971 | Costelloe et al. | 427/383 |

FOREIGN PATENTS OR APPLICATIONS

| | | | |
|---|---|---|---|
| 539,026 | 2/1956 | Italy | 427/383 |

*Primary Examiner*—Ralph S. Kendall
*Attorney, Agent, or Firm*—Francis J. Mulligan, Jr.; Ewan C. MacQueen

[57] ABSTRACT

A process of slurry coating particularly adapted to coatings less than one mil thick wherein a basis metal is coated with particles of a second metal dispersed in a liquid containing alkali-stabilized silica sol as the predominate film forming ingredient. The coated basis metal is dried; the coating is sintered thereon and then is worked. Provided that the silica to metal ratio is within a special range, residual silica in the coating metal does not interfere with working.

9 Claims, 2 Drawing Figures

SLURRY COATING PROCESS

The present invention is concerned with coating of metal by slurry techniques and more particularly an improvement in such processes.

PRIOR ART AND PROBLEM

It has been disclosed, particularly in U.S. Pat. Nos. 3,310,870; 3,316,625 and 3,479,258 that mild steel can be coated with an aqueous slurry containing dispersed metal; e.g., nickel powder, the water of the slurry can be evaporated and that various operations can be performed so as to compact and bond the metal particles of the slurry to each other and to the steel to thereby produce a nickel coated steel product. The aforementioned patents are all assigned to The International Nickel Company, Inc., the assignee of the presently disclosed invention.

Each of the processes described and claimed in the aforementioned U.S. patents employs a slurry containing nickel particles and an organic film former particularly methyl cellulose. It is disclosed therein that methyl cellulose as well as certain other organic film formers can be pyrolyzed to leave practically no residue other than the desired metallic, e.g., nickel, chromium, silicon, etc., or conditions thereof. The present invention is distinguished by the facts that silica sol is used in slurries as a film former; that silica sol especially when incorporated into thin deposits of dry slurry, i.e., deposits less than about 3 mils (16 microns) thick, appears to convert to a film which is stronger than films formed by methyl cellulose in such thicknesses and which is characterized by relatively uniformly distributed small pores, that upon pyrolysis during sintering the silica remains as part of the metal coating without inhibiting sintering and without inhibiting subsequent working operations and, that upon working after sintering the uniformly distributed small pores are at least substantially eliminated.

It is deemed surprising to discover that in slurry coating of metal on metal, the strength of a silica film can be usefully employed without having a deleterious effect on the sinterability and workability of the coating metal.

Figure 2:
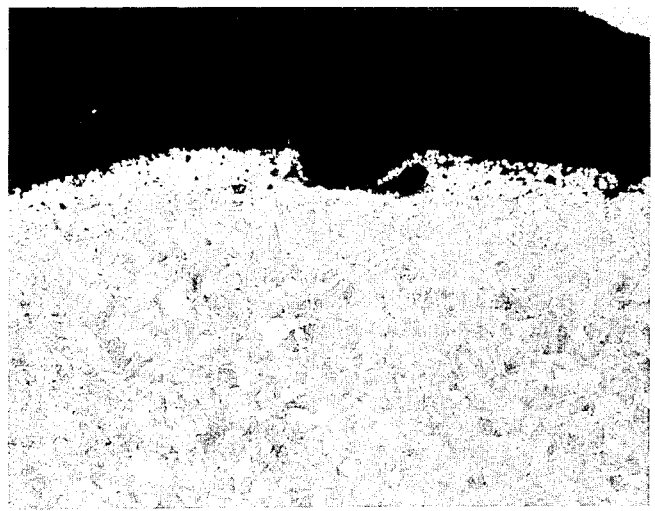

Other objects and advantages will become apparent from the following description taken in conjunction with the drawing in which FIG. 1 is a reproduction of micro photograph of a cross section of a steel surface coated with nickel in accordance with the present invention the surface being in the as coated, dried and sintered condition, and;

FIG. 2 is a reproduction of a micro photograph of a cross-section of a steel surface coated with nickel by means of a prior art type methyl cellulose slurry, the surface also being in the as-coated, dried and sintered condition.

Generally speaking, the present invention contemplates in a process of coating at least part of the surface of a first ductile metal (e.g., steel) with a second metal, (e.g., nickel) or alloy wherein the first metal has a melting point in excess of the sintering temperature of the second metal which comprises (1) depositing onto the surface of the first metal a substantially uniformly thick layer of an aqueous slurry containing particles of the second metal (2) drying the aqueous slurry to remove water therefrom without boiling the aqueous medium, (3) optionally cold compacting the dried slurry to a density greater than about 90% theoretical, (4) sintering the cold compacted dried slurry in situ on the metal surface in an atmosphere reducing to the oxides of the first and second metals to metallurgically bond second metal particles to each other and to the first metal surface and (5) eliminating porosity in the coating, advantageously by working the metal having the sintered coating on the surface thereof to at least partly deform the underlying basis metal, the improvement comprising employing as the aqueous slurry, a slurry having, in the liquid aqueous continuum an alkali-stabilized silica sol as the predominate film-forming ingredient, and containing about 35 or 50% to about 80 or 85% by weight of particles of the second metal or alloy, said particles having a major dimension of about 0.5 to about 20 microns, the silica being present in amounts of about 0.8% to about 4% (advantageously 0.8 to 2%) by weight of the second metal and the mole ratio of silica to alkali metal being at least about 4. The improvement of the present invention is particularly applicable to the formation of very thin coatings on metal where a thin layer of slurry, e.g., less than about 3 mils (76 microns) thick in the as-coated and dried condition is employed.

The two micro photographs in the drawing are representative of the appearance at 100 magnification of the types of coatings in the as-coated, dried and sintered condition that are achieved with the present invention as well as with the prior art. The coatings are both about 1 to about 2 mil thick and both have defects. However, the defects in the coating of FIG. 1 made with silica sol are small, relatively uniformly distributed and can be eliminated or substantially eliminated by smearing of the coating metal (nickel) during cold working (e.g., wire drawing). On the other hand, the defects in the coating depicted in FIG. 2 are comparatively larger and less well distributed and usually survive as defects after wire drawing.

The first metal, forming the basis for the coating, is advantageously iron or a carbon steel. For example, 1010 grade steel 1060 grade steel or substantially pure iron, e.g., Armco iron, are suitable where it is desired to form a product having an iron or steel base. Of course, other metals such as copper and copper-base alloys, nickel and nickel base alloys, etc., can be used as the base provided that they remain solid or at least semi-solid during sintering and further provided that during sintering they present a metallic surface to the particles of second metal. As those skilled in the art will appreciate, the first metal surface must be clean and should be in a hydrophilic condition so as to be wet by the aqueous slurry, i.e., a slurry having a base of water or a mixture of water and a water misable, volatile organic liquid such as ethanol. In the case of low alloy steel, it has been found advantageous to pickel the steel in hydrochloric acid and to thoroughly clean the pickled steel surface with chelated, biodegradeable, alkaline cleaner such as the product known as "Dynadet Cleaner" marketed by the Oakite Corporation.

The thoroughly clean surface of the first metal is then coated, at least in part, with the aqueous slurry containing particles of the second metal and silica sol. The slurry can contain about 30% to about 85% by weight of metal in the form of particles or flakes in the low micron size range, e.g., from about 1 to about 20 microns in major dimension. The particles of the second metal (or metals when alloy coatings are to be formed)

advantageously are substantially equiaxed and can be derived from decomposition of compounds such as in the case of nickel powder formed by thermal decomposition of nickel carbonyl or can be formed by atomization of molten metal, for example, in the cases of copper and a 70/30 nickel copper alloy. Only in rare cases will mechanically ground metal particles be useful because ductile metals, amendable to being worked as normally required in the process of the invention, usually are not readily ground to fine particle sizes by mechanical means. One such rare case is chromium which can be mechanically ground, e.g., ball milled to fine particles but which, when annealed and/or alloyed, will be sufficiently ductile to form coatings in accordance with the present invention. The second, or coating metal advantageously has a melting point (or melting range) in excess of about 700° C. The second metal can contain alloying ingredients such as aluminum which interdiffuse the metallic phase or a dispersoid such as aluminum oxide which is dispersed in the metallic phase. In all cases the resultant alloy should be ductile.

The alkali stabilized silica sols useful in forming slurries for use in the process of the present invention are advantageously those marketted by I. E. DuPont de NeMours Co., Inc., under the trade designations Polysilicate 48 and Polysilicate 85. Technical descriptions of such products are set forth in any one or more of U.S. Pat. Nos. 2,574,902; 2,577,485 and 2,750,345. Other comparable alkali-stabilized silica sols which have a ratio of silica to alkali metal of about 4 to about 400 are also satisfactory. It is highly advantageous that silica sol be essentially the sole binder material in the slurry and that the percentage of silica based upon the weight slurried metal powder be about 1% to about 1.5%. Best results with slurried nickel powder are obtained when the percentage of silica, based upon weight of nickel, is about 1.1 to 1.2%. In order that metal particles be held in a reasonably stable slurry, it is advantageous to include in the slurry, in addition to water, metal powder and stabilized silica sol, a thickening agent. One advantageous thickening agent is a polysaccharide (xanthan gum) sold under the trade designation of Kelzan by the Kelco Company. Other satisfactory thickening agents are Ben-A-Gel a beneficiated hydrous magnesium silicate, Benaqua a modified clay, and water soluble resins sold under the trade designation Carbopol; e.g., Carbopol 941. The thickening agent is normally used in amounts of about 0.1% to about 1% by weight based upon the water and polysilicate content of the slurry. A wetting agent such as Antarox BL 240 an aliphatic polyether can also be used. The room temperature (25° C) viscosity of the slurry in centiposes (cps) as measured on a Brookfield viscometer under high shear conditions lies in the range between about 500 and 1300 cps. For spray application the slurry viscosity should be about 500 to 1300 cps. and for dip coat application, the slurry viscosity can be in the range of 500 to 1000 cps. The slurry composition in accordance with the invention which advantageously contains about 55% to about 85% by weight of metal and about 1% to about 1.5% silica is readily compounded by simple mixing techniques.

The slurry is coated on the substrate metal in an amount calculated to provide the ultimately required thickness of coating metal and ratio of basis metal to coating metal. Purely as an illustration, a dry nickel slurry coating averaging 4 mils (0.1 millimeter (mm)) deposited on a steel strip 44 mils (1.1 mm) thick, results in, after sintering and subsequent cold rolling, a cold rolled product 10 mils (0.25 mm) thick of which about 0.6 to 0.8 mil (15 to 20 microns) is a layer of nickel. As mentioned hereinbefore, the slurry is dried by evaporation into a rapidly moving air stream held at a temperature not significantly higher than room temperature, e.g., about 30° C. It is an important feature of the present invention that the slurries employed do not require heat to gel or set the silica binder. One particular advantage of the improvement of present invention is that a slurry coated thin steel sheet or strip having a properly dense dried coating thereon can be coiled over a two inch (5.08 cm.) or larger mandrel and thereafter sintered in the open coil configuration.

The dried, dense slurry coated base metal is sintered in order to metallurgical bond the slurry metal particles to each other and to the base. Using as an example, a type 1008 steel base and nickel-containing slurry, sintering can be carried out at temperatures in the range of about 1625° F to about 2050° F (i.e., 885° to 1120° C). Table I sets forth specific temperatures and times which have been found to be operable for this combination of materials.

TABLE I

| Temp. ° F | Temp. ° C | Time (minutes) |
|---|---|---|
| 1625 | 884 | 20 |
| 1700 | 928 | 5 |
| 1800 | 982 | 2 |
| 1900 | 1038 | 1 |

It has been found most advantageous to sinter at about 1850° F (1010° C) to about 1900° F (1038° C) for about 2 minutes. For this combination of materials a cracked ammonia sintering atmosphere has been found to be satisfactory. Those skilled in the art will appreciate that other atmospheres and other sintering time-temperature conditions, ascertainable by routine experimentation, will be appropriate for this and other combinations of materials.

Following sintering the coated metal substrate is worked. This working can be hot working, e.g., rolling in a protective atmosphere or it can be cold working or a combination of both. It is an advantage of the present invention that the sintered substrate need not be hot worked but can be cooled in a protective atmosphere to a temperature below about 300° C and thereafter cold worked in the open atmosphere. In the ordinary case of strip or sheet material this will involve cold rolling. While the amount of cold deformation necessary in accordance with the present invention will vary depending upon many factors, successful cold working has comprised rolling from about 0.046 inch (1.15 mm) to 0.010 inch (0.25 mm) (total thickness of base and coating) without intermediate annealing. In a different situation, where the product was a steel wire having a nickel coating adapted to inhibit formation of brittle phases during subsequent aluminizing or galvanizing, the cold deformation consisted of cold drawing a 0.5 inch (12.7 mm) slurry nickel-coated and sintered steel bar to a diameter of 0.0094 inch (0.235 mm) with a soap lubricant using four intermediate anneals of 1850° F (1010° C) for 3 minutes. Use of more efficient oil-base lubricants eliminates need for some annealing in such an operation. It is a basic discovery of the present invention that silica, which must be copresent in the coating metal in an amount of the order of 4 to 10% by volume, does not inhibit cold working of this magnitude and does not deleteriously affect the integrity of the coating as measured by corrosion tests.

When the present process is applied to coating of products produced by cold drawing certain precautions are necessary. In the first instance, sintering must precede cold drawing. Secondly, the coating on the base metal should be relatively thin, e.g., about 0.5 to about 2.5 mils (12 to 65 microns) thick. Finally, the sintering should be carefully controlled. For example, when coating nickel on steel wire sintering at temperatures of 1900° F (1038° C) to 2050° F (1120° C) produced better results than sintering at 1800° F (982° C). Also appropriate to production of drawn nickel coatings on steel wire is the observation that more favorable results are obtained with a relatively hard steel, i.e., grade 1060 than with a soft steel, i.e., grade 1005.

The process of the present invention is highly useful in the production of many coated metal products having substantial utility in commerce. For example, as mentioned hereinbefore, steel wire coated with nickel can be galvanized or aluminized to provide a corrosion-resistant product substantially devoid of a brittle interlayer between the external metal and the underlying steel. A different kind of corrosion-resistant product comprises steel sheet coated with a nickel-chromium or nickel-chromium-iron alloy. This different kind of corrosion resistant product is highly useful in forming components of automotive exhaust systems, particularly catalyst containers subject to carburizing and oxidizing atmospheres at high temperatures. Such nickel-chromium alloy coatings are made by employing a slurry containing elemental nickel and chromium in relative amounts to provide alloy compositions containing about 12% to about 25% chromium with the balance being principally nickel, i.e., at least 50% by weight of nickel. From an economic point of view, it is advantageous to provide chromium in the form of ferro-chrome powder and thus produce an alloy coating containing a small amount of iron, e.g., up to 12% by weight. As those skilled in the art are aware, nickel-chromium and nickel-chromium-iron alloys can also include small amounts of aluminum, silicon, titanium, rare earths, thorium, titanium and similar elements which can enhance resistance of the alloy coated product to high temperature oxidation while not detrimentally affecting ductility of the coating. Such elements can be included in slurry coatings as elemental powders or powders of master addition alloys.

Another type of product producible by means of the present invention is tokens or coins. In this type of product, the metal base is in the form of a disc which is coated with slurry by spraying. After sintering, the token or coin blank is then cold worked by coining with or without edge milling. In this manner, attractive tokens have been produced having a steel base and a nickel or cupro-nickel surface.

In order to give those skilled in the art a greater appreciation of the advantage of the present invention, the following examples are given:

EXAMPLE I

A pickled, cleaned low alloy steel strip 0.044 inch (1.15 mm) thick was coated by spraying with a slurry containing in parts by weight 43.1 nickel powder (type 123), 51.3 water, 5.4 polysilicate 48 sol (20% silica) and 0.25 Carbopol 941. After gently drying, the thickness of the dried slurry averaged 0.004 inch (100 microns). The coating on the steel strip was then cold densified by cold rolling (protected by a cover plate on the coated side) to a total thickness of 0.046 inch (1.17 mm). The cold rolled strip, bendable over a two inch (5.08 cm) mandrel without coating cracking, was then sintered for 2 minutes at 1800° F (982° C) in an atmosphere of cracked ammonia. After cooling the strip was then cold rolled in six passes (without intermediate anneal and using Varsol cold rolling lubricant) to a total thickness of 0.010 inch (0.25 mm). The resultant product having a nickel coating of 0.6 mil. (15 microns) (and after receiving a flash of chromium) withstood the CASS corrosion test (ASTM Designation B368-61 T) for 32 hours without failure (i.e., a numerical value greater than 8 after the specified duration).

EXAMPLE II

The procedure of Example I was repeated except that a slurry containing about 82 parts by weight of Polysilicate 85 sol (20% silica), 327 parts by weight water, 4 parts by weight Ben-A-Gel and 1425 parts by weight nickel 123 powder (i.e., about 78% by weight nickel) was coated on steel strip to a dry thickness of 4 mils. (100 microns). The dried coated steel was sintered directly without cold compaction and thereafter cold rolled from 0.044 inch (1.15 mm) to 0.010 inch (0.25 mm).

EXAMPLE III

The procedure of Example I was repeated except that a slurry containing 900 parts by weight of mixed elemental nickel and copper powders to provide an alloy containing by weight 70% nickel-30% copper 550 parts by weight of water, 60 parts by weight of polysilicate 48 and 3.9 parts by weight of Carbopol 941 was coated on a steel substrate and cold compacted to a dry compacted thickness of 50 microns. Thereafter, the coated and compacted product having a total thickness of 0.046 inch (1.15 mm) was sintered for 20 minutes at 1900° F (1030° C) in a cracked ammonia atmosphere. After subsequent cold rolling to provide a thickness of 0.022 inch (0.55 mm) the coated product was then heat treated for 15 minutes at 1250° F (676° C) in a cracked ammonia atmosphere and thereafter cold rolled to a thickness of 0.020 inch (0.5 mm). The final product exhibited good corrosion resistance in a hot water porosity test.

EXAMPLE IV

Rods 0.25 inch (6.35 mm) in diameter of 1005 and 1060 grade steel were dip coated with nickel slurry containing 1160 parts by weight of nickel, 84 parts by weight of polysilicate 48 sol, 1.2 parts by weight of Benaqua clay and 0.8 parts by weight of xanthan gum thickener and 480 parts by weight of water to provide dried coatings about 1.5 and 8 (38 and 200 microns) mils thick. The rods containing the dried coating were sintered at temperatures in the range 1800° F (982° C) to 2050° F (1120° C) for 2 hours and then cold drawn. All samples sintered at 1850° F (1010° C) or higher withstood a first draw to 0.204 inch (5.18 mm) without cracking. After an anneal samples with a 1060 grade steel base could be further cold drawn to 0.187 inch (4.74 mm) without cracking, whereas samples with a softer steel base exhibited slight surface cracking after the same annealing and second cold draw.

EXAMPLE V

A slurry composition containing 240 parts by weight of water, 42 parts by weight of polysilicate 48, 1.4 parts by weight of xanthan gum, 183 parts by weight of nickel powder and 67 parts by weight low carbon ferrochrome containing 74% by weight chromium was coated on both sides of a pickled low carbon steel sheet to provide a dry coating thickness of 3 mils (75 microns) on each side. The coated dried sheet was cold rolled 10% and then sintered at 1750° F (955° C) for 16 hours. Thereafter the coated sintered sheet was cold rolled 65%, annealed for 16 hours at 1300° F (705° C) and temper rolled. Specimens taken from the thus produced coated product and formed by cupping and zero T bending were subjected to a 1500° F (815° C) cyclic oxidation test for 100 hours, said test involving cycling the specimen to room temperature three times a day for the 4 days of test. The test samples endured these conditions in a satisfactory manner.

EXAMPLE VI

Pickled rods of 1060 grade steel, 0.229 inch (5.82 mm) in diameter, were dipped in the slurry of Example V to form a coating thereon about 3 mils (75 microns) thick. After drying, three samples of the coated rods were sintered for 10 minutes, one at 1750° F (955° C) one at 1900° F (1038° C) and one at 2100° F (1150° C). After sintering, the rods were drawn to 0.217 inch (5.51 mm) and then to 0.204 inch (5.18 mm). The two rods sintered at the higher temperatures drew down satisfactorily whereas the coating on the rod sintered at 1750° F (955° C) failed. The two successfully drawn rods were then annealed at 1900° F (1038° C) and 2100° F (1150° C) respectively (in duplication of the sintering temperature) for 10 minutes and were then drawn down to 0.156 inch (3.96 mm) to provide satisfactory drawn products.

EXAMPLE VII

A slurry containing 120 parts by weight of water, 21 parts by weight of polysilicate 48, 0.7 part by weight of xanthan gum, 200 parts by weight of nickel powder and 50 parts by weight of chromium powder was coated on a pickled, mild steel sheet about 0.055 inch (1.37 mm) thick. The coating, when dry was about 1.5 mil (38 microns) on each side. The coated sheet was then cold rolled 5% to compact the coatings and then sintered at 1900° F (1030° C) for 2 minutes. Thereafter the coated, sintered sheet was cold rolled to 0.040 (1.0 mm) and annealed at 1900° F (1038° C) for 10 minutes. The resultant product was then subjected to an 1800° F (982° C) cyclic oxidation test for 30 hours wherein the specimens are cycled to room temperature every two hours. Specimens subjected to this test lost in weight 46.25 milligrams per square centimeter ($mg/cm^2$) over the thirty hours. In contrast in an identical test carried out for 36 hours, stainless steel grade 409 lost weight in the amount of 353.5 $mg/cm^2$.

EXAMPLE VIII

Slurries were made up containing 43.1 parts by weight of metal powder, 51.3 parts by weight of water 5.4 parts by weight of polysilicate 48 and 0.25 part by weight of Carbopol 941. Mild steel token blanks were coated with two coats of slurry, the first with nickel as the metal and the second (or outer layer) with coinage alloy or nickel in the slurry. The token blanks were then sintered for 10 minutes, at 1038° C when all nickel was used, at 1010° C when 75 copper 25 nickel was used as the outer layer, at 982° C when powdered coinage bronze (1.5% zinc, 0.5% tin balance copper) was used as the outer layer and at 854° C when elemental bronze made up of 1% tin powder, 10% zinc powder balance copper powder was used as the outer layer. The thus sintered coated token blanks were then pressed at 25 tons, (22,600 Kg) edge rolled, subjected to a second identical sintering operation and then cold embossed at 75 to 120 tons (68,180 to 10,900 Kg) pressure. Satisfactory tokens were produced having excellent coinage quality.

EXAMPLE IX

Steel sheet was coated with silica sol slurries similar to the slurry used in Example I except that the metal in the slurries was atomized powdered stainless steel. In one slurry grade 316 stainless steel powder was used and in another slurry grade 304 1 stainless steel powder was used. The coated and dried sheets were sintered at 2050° F (1122° C) for 2 minutes and then cold rolled from 0.059 inch (1.47 mm) to 0.051 inch (1.27 mm). Each of the coatings in Example IX are relatively uniform and pore free.

As to all of the examples, in those cases where the coatings are of nickel on steel and the coatings are in excess of about 0.6 mil (15 microns), e.g., 0.8 mil (20 microns) to 1.5 mil (38 microns) they exhibit results in the Cass test (after having been flashed with chromium) equivalent to or better than electrodeposited coatings of equivalent thicknesses.

Metals and alloys other than those set forth hereinbefore which can be used as powders in the slurry coatings include copper, cobalt, iron and any other metal or alloy which can be protected from oxidation during sintering by readily obtainable atmospheres which may be somewhat contaminated with water baked out of the slurry. When employing in silica sol slurry, metals or alloys which melt at temperatures in excess of 700° C, it is possible to provide useful intermediate products by merely sintering the metal, e.g., nickel, onto the base. For example, a steel sheet having a sintered nickel coating can be usefully employed as a base for hot dip galvanizing or aluminizing. Likewise such a sintered layer can be used as a base for soldering or brazing when the base metal is difficultly wettable by solder or braze metal. Additionally, a steel or other base can be coated with a layer of a high nickel copper-nickel alloy as a base for a terne coating.

It is to be noted that in the foregoing specification where both conventional and metric units are disclosed, the metric units were obtained by conversion. Accordingly, if any discrepancy exists between units, the conventional unit should prevail.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In a process of slurry coating at least a portion of the surface of a basis metal with a slurry containing metal particles and drying and sintering the metal of the slurry onto said basis metal wherein the basis metal has a melting point in excess of the sintering temperature of the metal in the slurry and the metal of the slurry is one which can be protected from oxidation by readily obtainable atmospheres, the improvement comprising employing as the slurry, metal powder dispersed in an aqueous phase containing silica in alkali-stabilized sol form with a mole ratio of silica to alkali metal of at least about 4, wherein silica is the predominate film forming ingredient and is present in an amount of about 0.8% to about 4% by weight of silica based upon the weight of the metal particles in the slurry.

2. A process as in claim 1 wherein the sintered coating on the basis metal is compacted by working.

3. In the process of claim 2, the further improvement comprising drying said aqueous phase after coating by evaporating water into an air stream rapidly moving with respect to the coated surface and held at a temperature not exceeding about 30° C.

4. In the process of claim 2, the further improvement comprising coating the slurry onto the basis metal at a thickness of less than about 2.5 mils measured on the dried and sintered but uncompacted basis.

5. In the process of claim 2, the further improvement comprising compacting the metal of the slurry onto said basis metal solely by cold working.

6. In the process of claim 5, the further improvement comprising compacting the metal particles derived from the slurry to a density at least about 90% theoretical after drying the slurry but prior to sintering.

7. A process as in claim 1, wherein in the slurry, the silica of the silica sol is present in an amount of about 1% to about 1.5% by weight of the metal particles in the slurry.

8. A process as in claim 1 wherein the metal powder is selected from the group consisting of nickel, copper, nickel-base alloys, copper-base alloys, and stainless steels.

9. A process as in claim 2 wherein the basis metal is in the form of a token blank and the metal of the slurry is selected from the group consisting of nickel and nickel base and copper-base coinage alloys.

* * * * *